United States Patent
Shim

(10) Patent No.: US 12,372,621 B2
(45) Date of Patent: Jul. 29, 2025

(54) SENSOR PROTECTION DEVICE AND CONTROL SYSTEM THEREOF

(71) Applicants: HYUNDAI MOTOR COMPANY, Seoul (KR); KIA CORPORATION, Seoul (KR)

(72) Inventor: Yun Jeong Shim, Donghae-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 387 days.

(21) Appl. No.: 18/072,292

(22) Filed: Nov. 30, 2022

(65) Prior Publication Data

US 2023/0184898 A1 Jun. 15, 2023

(30) Foreign Application Priority Data

Dec. 15, 2021 (KR) .................. 10-2021-0179468

(51) Int. Cl.
| | | |
|---|---|---|
| *B60S 1/56* | (2006.01) | |
| *B60Q 9/00* | (2006.01) | |
| *B60S 1/02* | (2006.01) | |
| *B60S 1/04* | (2006.01) | |
| *B60S 1/46* | (2006.01) | |
| *B60S 1/54* | (2006.01) | |
| *G01S 7/02* | (2006.01) | |
| *G01S 7/40* | (2006.01) | |
| *G01S 7/481* | (2006.01) | |
| *G01S 7/497* | (2006.01) | |

(52) U.S. Cl.
CPC .............. *G01S 7/4813* (2013.01); *B60Q 9/00* (2013.01); *B60S 1/46* (2013.01); *B60S 1/54* (2013.01); *G01S 7/027* (2021.05); *G01S 7/4043* (2021.05); *G01S 2007/4977* (2013.01)

(58) Field of Classification Search
CPC ... B60S 1/26; G01S 7/4043; G01S 2007/4977
See application file for complete search history.

(56) References Cited

U.S. PATENT DOCUMENTS

| | | |
|---|---|---|
| 10,220,817 B2 | 3/2019 | Rice |
| 10,549,726 B2* | 2/2020 | Garcia Crespo ........ B60S 1/524 |
| 11,305,741 B2 | 4/2022 | Frederick et al. |
| 11,860,316 B1* | 1/2024 | Zhang ................... G01S 17/931 |
| 2017/0210351 A1 | 7/2017 | Ghannam et al. |
| 2017/0244873 A1* | 8/2017 | Izabel ....................... B60S 1/04 |
| 2018/0015908 A1 | 1/2018 | Rice |
| 2019/0204426 A1* | 7/2019 | Vaishnav ................ G01S 7/497 |
| 2020/0086833 A1 | 3/2020 | Frederick et al. |
| 2023/0057122 A1* | 2/2023 | Stefani .................... B60S 1/566 |

\* cited by examiner

*Primary Examiner* — Herbert K Roberts
(74) *Attorney, Agent, or Firm* — Lempia Summerfield Katz LLC

(57) ABSTRACT

A sensor protection device is configured to protect an environmental sensor of a vehicle. The sensor protection device includes a protector that is disposed to face the environmental sensor and configured to be movable with respect to the environmental sensor and includes a movement mechanism configured to provide power to the protector. The movement mechanism has a structure to move the protector.

8 Claims, 8 Drawing Sheets

SENSOR PROTECTION DEVICE AND CONTROL SYSTEM THEREOF

CROSS-REFERENCE TO RELATED APPLICATION

This application claims under 35 U.S.C. § 119(a) the benefit of priority to Korean Patent Application No. 10-2021-0179468, filed on Dec. 15, 2021, the entire contents of which are incorporated herein by reference.

BACKGROUND

(a) Technical Field

The present disclosure relates to a sensor protection device. More particularly, it relates to a sensor protection device for protecting an environmental sensor of a vehicle.

(b) Background Art

Recently, in order to secure safe driving in various driving situations, a driver assistance system configured to assist a driver of a vehicle is mounted in the vehicle. Further, in addition to the driver assistance system, research and development of an autonomous vehicle capable of driving autonomously without the intervention of a human driver are being actively conducted.

The driver assistance system and the autonomous vehicle require various types of environmental sensors capable of sensing the surrounding environment in various ways. Examples of the environmental sensor mounted in the vehicle include a radar, a LiDar, a camera, and the like.

Since the above-mentioned environmental sensors are mounted on the outside of the vehicle, sensing portions of the environmental sensors may be easily contaminated by foreign substances, such as dust and dirt, rain, and snow. In order to maintain capability of the environmental sensors, the environmental sensors need to be kept clean to a certain degree. Accordingly, a sensor cleaning system is provided in the vehicle to clean the environmental sensors when the sensing portions thereof are contaminated or stained.

The above information disclosed in this Background section is only to enhance understanding of the background of the present disclosure. Therefore, the Background section may contain information that does not form the prior art that is already known in this country to a person of ordinary skill in the art.

SUMMARY OF THE DISCLOSURE

The present disclosure has been made in an effort to solve the above-described problems associated with the prior art. It is an object of the present disclosure to provide a sensor protection device capable of protecting a sensor of a vehicle and a sensor cleaning system thereof.

The objects of the present disclosure are not limited to the above-mentioned object. Other objects not yet mentioned should be clearly understood by those of ordinary skill in the art to which the present disclosure pertains (hereinafter referred to as "those skilled in the art") from the following descriptions.

In one aspect, the present disclosure provides a sensor protection device including a protector disposed to face an environmental sensor and configured to be movable with respect to the environmental sensor and including a movement mechanism configured to provide power to the protector. The movement mechanism has a structure to move the protector.

In another aspect, the present disclosure provides a control system of a sensor protection device. The control system includes: an environmental sensor configured to detect a surrounding environment of a vehicle; a protector disposed to face the environmental sensor; a movement mechanism configured to provide power to the protector; a contamination degree determination unit configured to determine a degree of contamination of the environmental sensor; and a controller configured to collect information from the contamination degree determination unit and to control operation of a sensor cleaning system of the vehicle and the movement mechanism. The sensor cleaning system cleans the environmental sensor.

Other aspects and embodiments of the present disclosure are discussed below.

It should be understood that the terms "vehicle" or "vehicular" or other similar terms as used herein include motor vehicles in general. Such motor vehicles may encompass passenger automobiles including sport utility vehicles (SUVs), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, such as for example, a vehicle that is powered by both gasoline and electricity.

The above and other features of the present disclosure are discussed below.

BRIEF DESCRIPTION OF THE DRAWINGS

The above and other features of the present disclosure are now described in detail with reference to certain embodiments thereof illustrated in the accompanying drawings, which are given hereinbelow by way of illustration only. Thus, the drawings are not limitative of the present disclosure, and wherein.

Figure 1:
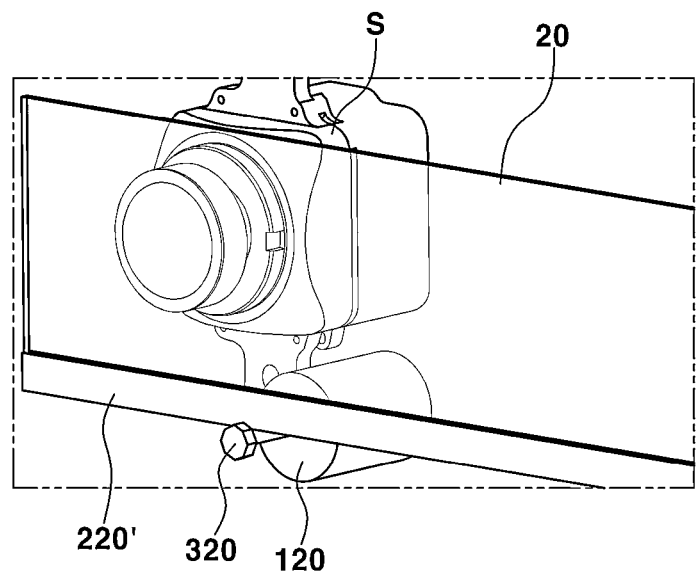
FIG. 1 shows a sensor protection device according to an embodiment of the present disclosure.

It should be understood that the appended drawings are not necessarily to scale, presenting a somewhat simplified representation of various features illustrative of the basic principles of the present disclosure. The specific design features of the embodiments as disclosed herein, including, for example, specific dimensions, orientations, locations, and shapes are determined in part by the particular intended application and use environment.

In the figures, reference numbers refer to the same or equivalent parts of the present disclosure throughout the several figures of the drawing.

DETAILED DESCRIPTION

Specific structural or functional descriptions made in connection with the embodiments of the present disclosure are merely illustrative for the purpose of describing embodiments according to the concept of the present disclosure. The embodiments according to the concept of the present disclosure may be implemented in various forms. Further, it should be understood that the present description is not intended to limit the disclosure to the embodiments. On the contrary, the present disclosure is intended to cover not only the disclosed embodiments, but also various alternatives, modifications, equivalents, and other embodiments, which may be included within the spirit and scope of the present disclosure as defined by the appended claims.

Meanwhile, in the present disclosure, terms such as "first" and/or "second" may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the concept of the present disclosure.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that other components are not present therebetween. Other expressions for the description of relationships between components, e.g., "between" and "directly between" or "adjacent to" and "directly adjacent to", should be interpreted in the same manner.

The same reference numerals represent the same or equivalent components throughout the specification. Additionally, the terms in the specification are used merely to describe embodiments and are not intended to limit the present disclosure. In this specification, an expression in a singular form also includes a plural form, unless otherwise clearly specified in context. As used herein, expressions such as "comprise" and/or "comprising" do not exclude the presence or addition of one or more components, steps, operations, and/or elements other than those described. When a component, device, element, or the like of the present disclosure is described as having a purpose or performing an operation, function, or the like, the component, device, or element should be considered herein as being "configured to" meet that purpose or to perform that operation or function.

Hereinafter, the present disclosure is described in detail with reference to the accompanying drawings.

As described above, various types of environmental sensors configured to sense the surrounding environment are mounted in an autonomous vehicle and a vehicle provided with a driver assistance system. As a non-limiting example, the environmental sensors may include a LiDAR, a radar, a camera, and the like and may be disposed on the front, rear, side, and roof of the vehicle.

As vehicles stay outside most of the time and are left in various driving conditions, the environmental sensors installed on the outside of the vehicle may be contaminated by foreign substances, such as dust and insects, as well as rain. Accordingly, a sensor cleaning system is provided in the vehicle to clean the contaminated environmental sensors. The sensor cleaning system may clean the contaminated environmental sensors by using a washer fluid or by spraying high-pressure air.

Even though the sensor cleaning system performs a cleaning operation, contaminants that cannot be removed even by the high-pressure air or the washer fluid may exist on the environmental sensors, which results in deterioration in sensor performance. For example, in many cases, a lovebug causes serious damage to the vehicle. Since the lovebug likes vehicle fumes, vehicle engine heat, radiant heat from asphalt, and vehicle vibration, the same is likely to approach a vehicle. The lovebug hit by the vehicle is known to oxidize within 24 hours. The remains of the hit lovebug may adhere to the environmental sensor, even though cleaning is performed by spraying high-pressure air or by using washer fluid. In this case, the environmental sensor may malfunction or may not operate normally. Additionally, when the protective coating of the environmental sensor is damaged by an acid content of the remains of the lovebug, contamination of the environmental sensor occurs more easily, which causes the sensor cleaning system to operate excessively. As a result, in the sensor cleaning system using compressed air, a compressor load increases due to the frequent operation of the compressor. In case of the sensor cleaning system using washer fluid, the washer fluid is required to be frequently replenished.

Further, when chipping and scratching occur on the environmental sensor, a coating material thereof is damaged or dented. In this case, the resolution of the sensor may deteriorate, which adversely affects sensor performance.

Accordingly, the present disclosure provides a sensor protection device capable of preventing damage to an environmental sensor and preventing contamination thereof and improving durability of the environmental sensor and a sensor cleaning system.

Figure 2:
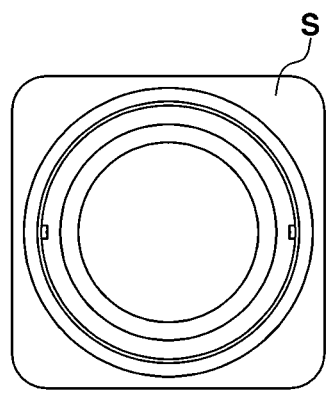
FIG. 2 is a front view of an environmental sensor.
Figure 3:
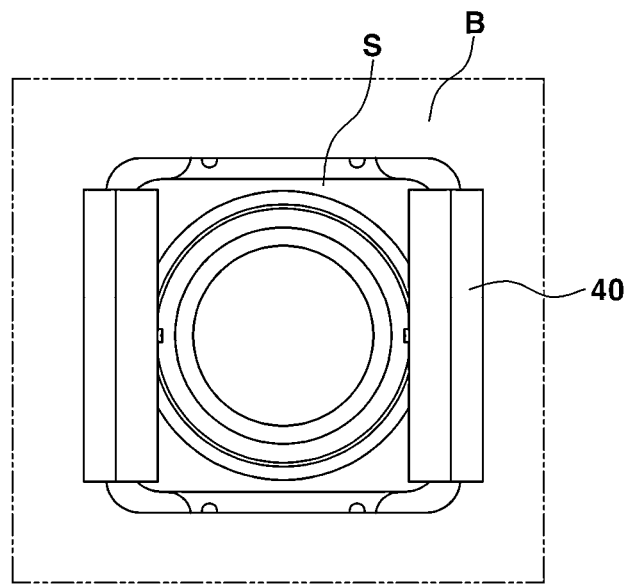
FIG. 3 shows a mounting view of the sensor protection device according to an embodiment of the present disclosure.

As shown in FIGS. 1-3, according to an embodiment of the present disclosure, the sensor protection device includes a protector 20 and a movement mechanism.

The protector 20 is disposed to protect an environmental sensor S. Specifically, the protector 20 is disposed on a vehicle body B to protect a sensing portion of the environmental sensor S from the outside. In an embodiment, the protector 20 may be disposed at a position through which sensing signals, such as a radio wave and a beam of the environmental sensor S pass. Accordingly, the sensing portion of the environmental sensor S may be protected by the protector 20. The protector 20 is disposed on the front of the environmental sensor S in a sensing direction but may be disposed parallel to or obliquely relative to the environmental sensor S. The protector 20 may be mounted on the environmental sensor S or may be disposed adjacent to the environmental sensor S to cover the sensing portion thereof.

In an embodiment, the protector 20 may be disposed to face the environmental sensor S or the sensing portion of the environmental sensor S. In an embodiment, the protector 20 may be disposed inside the vehicle body B while facing the environmental sensor S.

The protector 20 may be made of a transparent material. For example, the protector 20 may contain glass, acrylic, and the like.

The movement mechanism enables the protector 20 to move with respect to the environmental sensor S. The movement mechanism includes a driving source 120 configured to supply power to move the protector 20. For example, the driving source 120 may be a motor.

According to an embodiment of the present disclosure, the movement mechanism may further include a rack-and-pinion structure.

Figure 4A:
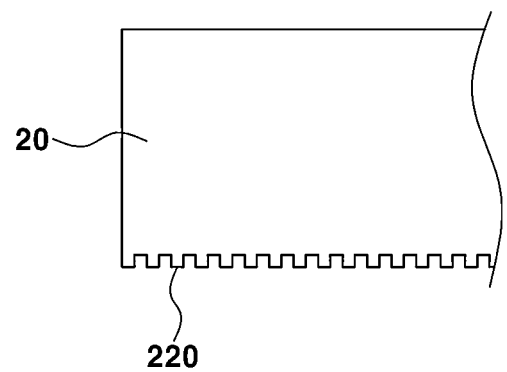
FIGS. 4A and 4B show a protector of a sensor protection device according to various embodiments.
Figure 4B:
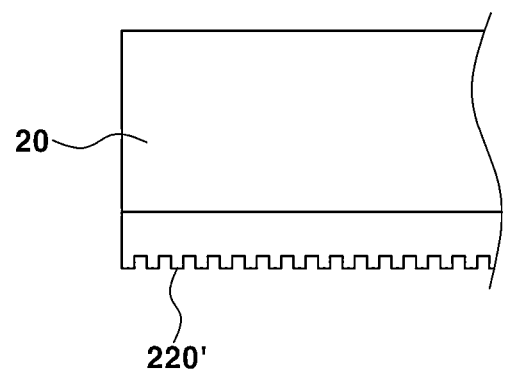

As shown in FIG. 4A, in some embodiments, one side of the protector 20 may be formed as a linear gear 220. As a non-limiting example, when the protector 20 is configured to move from side to side, one side of the protector 20 having the linear gear 220 formed thereon may be an upper end portion and/or a lower end portion of the protector 20. Alternatively, when the protector 20 is configured to move upwards and downwards, one side of the protector 20 having the linear gear 220 formed thereon may be a left end portion and/or a right end portion of the protector 20. As shown in FIG. 4B, in some embodiments, a separate linear gear or a rack 220' may be coupled to one side of the protector 20.

A pinion gear 320 is configured to mesh with the linear gear 220 or the separate rack 220' provided in the protector 20. Accordingly, the protector 20 may move while the pinion gear 320 meshes with the linear gear 220 or the rack 220' according to rotation of the pinion gear 320.

The driving source 120 provides rotational force to the pinion gear 320. When the pinion gear 320 rotates, the linear gear 220 or the rack 220' configured to mesh with the pinion gear 320 may linearly move.

According to some embodiments of the present disclosure, the movement mechanism may have various structures in addition to the rack-and-pinion structure. In an embodiment, the movement mechanism may have a wire-and-guide structure. For example, in the wire-and-guide structure, a wire having one end fixed to the vehicle may be connected to the protector 20 and a length of the wire may be changed according to rotation of the driving source 120, thereby moving the protector 20. Such a wire-and-guide structure is a type used for a power window in a vehicle.

In some embodiments, the movement mechanism may have a link structure. In the link structure, a link is connected to the protector 20 and the link may move according to the driving of the driving source 120 and thus the protector 20 may be moved.

Figure 5A:
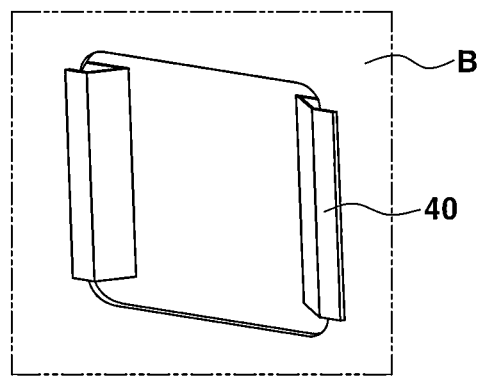
FIG. 5A shows a mounting view of a blade according to an embodiment of the present disclosure.
Figure 5B:
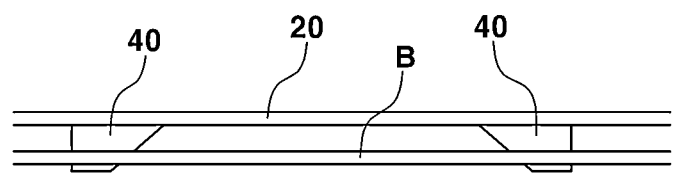
FIG. 5B is a planar cross-sectional view of FIG. 5A.

As shown in FIGS. 5A and 5B, according to some embodiments of the present disclosure, the sensor protection device further includes a blade 40. The blade 40 is fixed to contact the protector 20. For example, the blade 40 may be fixed to the vehicle body B. In an embodiment, the blade 40 may be fitted and fixed to the vehicle body B. In an embodiment, the blade 40 may be glued to the vehicle body B.

The blade 40 is disposed in contact with the protector 20 to remove contaminants on the protector 20. Particularly, the blade 40 may remove the contaminants on the protector 20 according to the movement of the protector 20. In an embodiment, the blade 40 is mounted in the vehicle body B in a direction perpendicular to a movement direction of the protector 20. Specifically, a longitudinal direction of the blade 40 and the movement direction of the protector 20 may be perpendicular to each other. When the protector 20 and the blade 40 are disposed in this manner, foreign substances on the protector 20 may be more easily removed.

Figure 6:
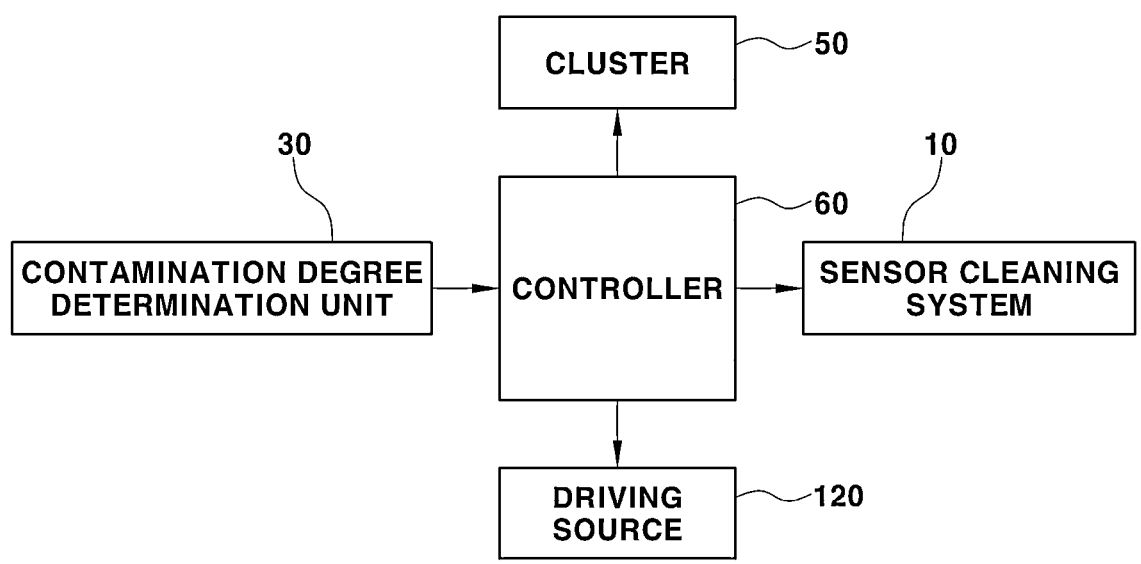
FIG. 6 is a view showing a relationship between peripheral systems of the sensor protection device according to an embodiment of the present disclosure.

Referring to FIG. 6, the sensor protection device according to the present disclosure further includes a controller 60. The controller 60 is configured to control the operation of the sensor protection device. The controller 60 may be a controller of a sensor cleaning system 10 of the vehicle. Alternatively, the controller 60 may be configured as a separate controller configured to communicate with a controller of the sensor cleaning system 10 of the vehicle.

In an embodiment, the sensor cleaning system 10 may be a cleaning system configured to clean the environmental sensor S using a washer fluid. In another embodiment, the sensor cleaning system 10 may be a cleaning system configured to clean the environmental sensor S by spraying compressed air to the environmental sensor S.

In any case, the sensor cleaning system 10 may perform cleaning of the environmental sensor S based on a degree of contamination of the environmental sensor S. For example, the operation of the sensor cleaning system 10 may be controlled based on determination of a contamination degree determination unit 30 configured to determine the degree of contamination of the sensing portion of the environmental sensor S. As an example, the contamination degree determination unit 30 may be a sensor including a light emitting unit and a light receiving unit, which are disposed on different optical axes. The light emitting unit is configured to supply light passing through the sensing portion of the environmental sensor S. The light receiving unit is configured to receive light supplied by the light emitting unit and passing through the sensing portion of the environmental sensor S. When the amount of light received by the light receiving unit is equal to or less than a predetermined value compared to the amount of light supplied by the light emitting unit, the contamination degree determination unit 30 may determine that the sensing portion of the environmental sensor S is contaminated. However, the contamination degree determination unit 30 is not limited to the type of the sensor described above. Other well-known determination methods may be used. As another example, the sensor cleaning system 10 may perform cleaning based on a preset cycle.

Meanwhile, in the present disclosure, cleaning the environmental sensor S by the sensor cleaning system 10 means that the environmental sensor S or the protector 20 is cleaned by the sensor cleaning system 10. In addition, the contamination degree determination unit 30 may be provided in the environmental sensor S and may determine contamination of the environmental sensor S through contamination of the protector 20. In another embodiment, the contamination degree determination unit 30 may be a device, provided separately from the environmental sensor S and configured to detect the contamination of the environmental sensor S or the protector 20.

The controller 60 may communicate with the contamination degree determination unit 30 of the environmental sensor S. The controller 60 may perform cleaning of the environmental sensor S or the protector 20 based on determination of the contamination degree determination unit 30. In an embodiment, the controller 60 may directly drive the sensor cleaning system 10 according to the determination of the contamination degree determination unit 30. In another embodiment, the controller 60 may request a controller provided in the sensor cleaning system 10 to perform cleaning thereof in response to the determination of the contamination degree determination unit 30.

The controller 60 may control the operation of the driving source 120. Specifically, when the environmental sensor S or the protector 20 is not clean even after sensor cleaning is performed based on the determination of the contamination degree determination unit 30, the controller 60 may drive the driving source 120 to move the protector 20.

Additionally, the controller 60 is configured to be able to communicate with a vehicle driver. Specifically, the controller 60 may issue a notification to the driver when the protector 20 is required to be replaced. The controller 60 may display a replacement notification message on a cluster 50 of the vehicle so that the driver takes appropriate action.

Hereinafter, the operation of the sensor protection device according to the present disclosure is described.

Figure 7:
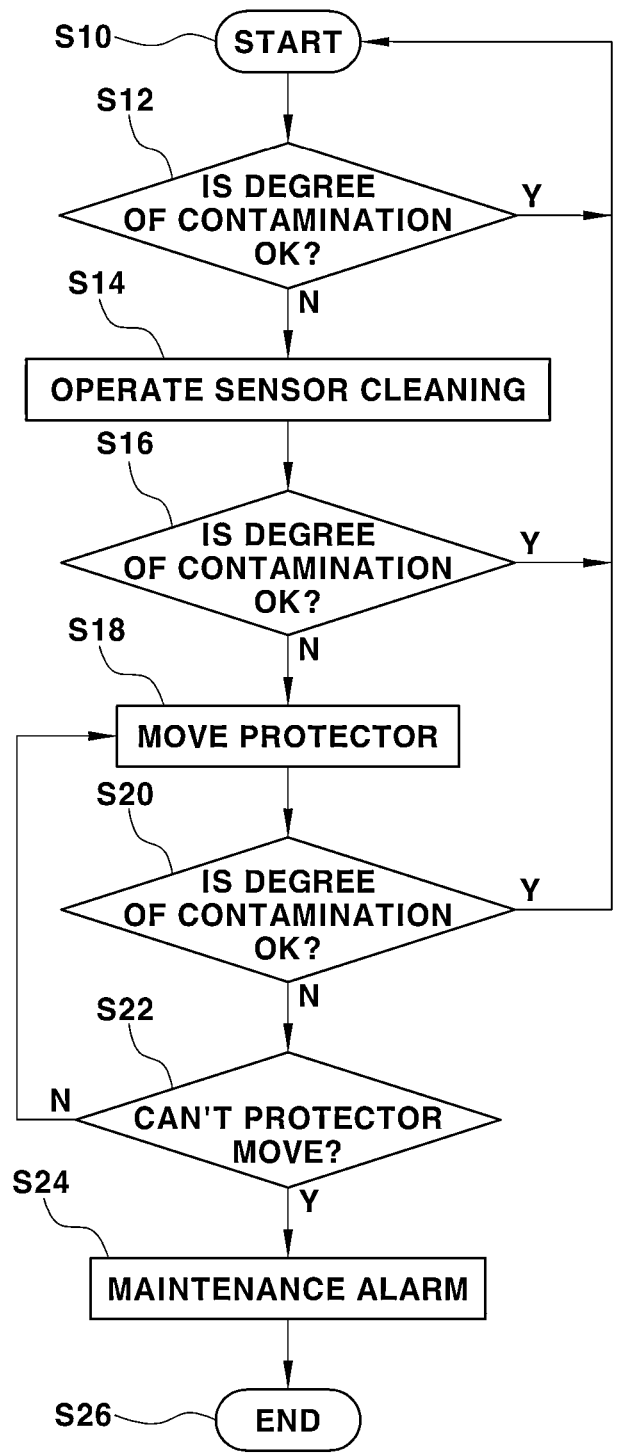
FIG. 7 shows an operation flowchart of a sensor protection device according to some embodiments of the present disclosure.

FIG. 7 shows an operation flowchart of the sensor protection device when the blade 40 is omitted.

In step S10, the operation of the sensor protection device is started.

The controller 60 collects contamination information of the environmental sensor S or the protector 20 from the contamination degree determination unit 30. The controller 60 determines whether the degree of contamination exceeds a preset reference value based on the contamination information from the contamination degree determination unit 30 in step S12.

When the degree of contamination exceeds the preset reference value (N in S12), the controller 60 causes the sensor cleaning system 10 to perform sensor cleaning in step S14. As described above, the controller 60 may directly issue a cleaning command to the sensor cleaning system 10 or may indirectly make a cleaning request to the sensor cleaning system 10.

Figure 8:
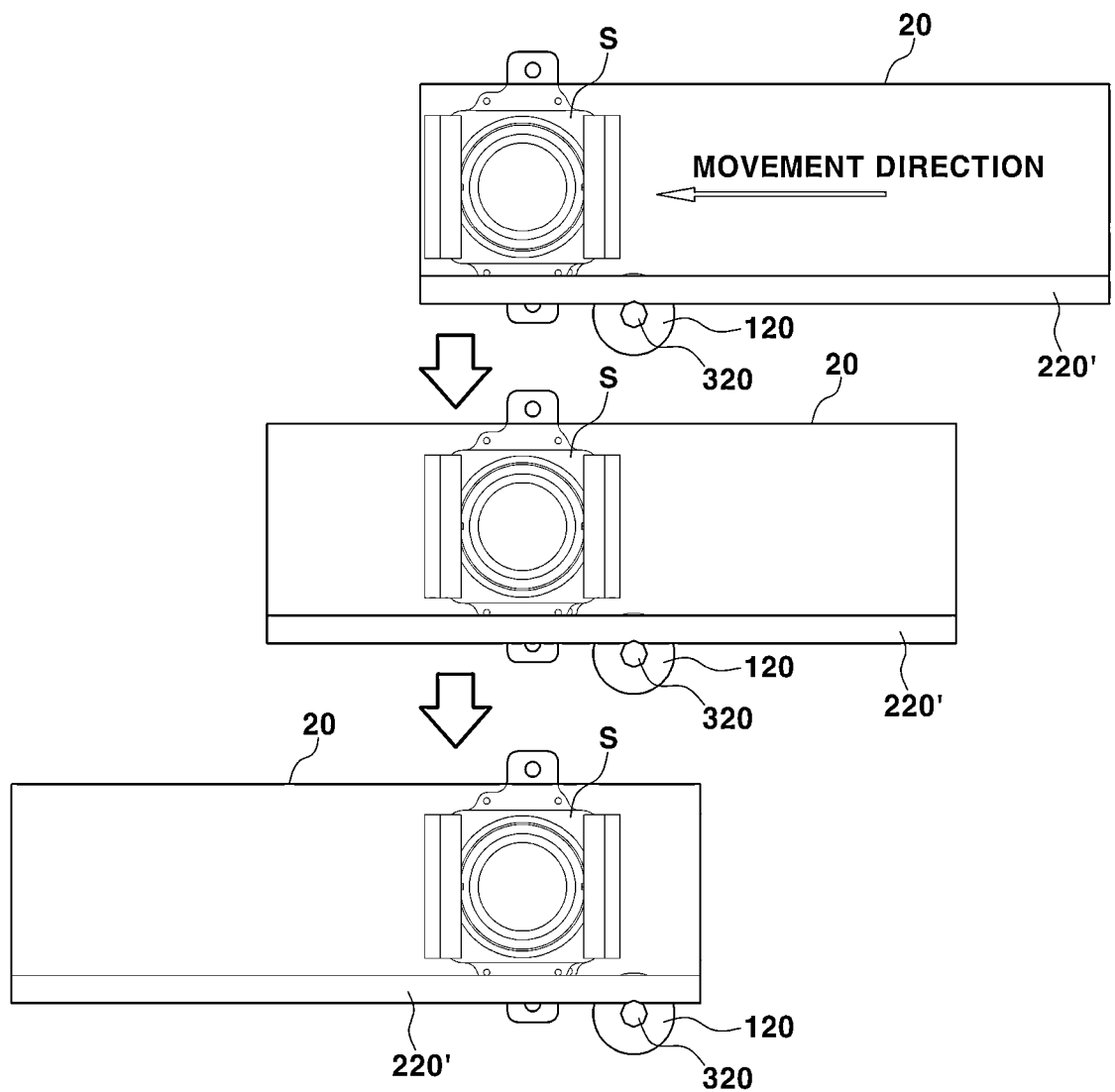
FIG. 8 shows a movement of a protector of the sensor protection device according to some embodiments of the present disclosure.

After sensor cleaning is performed, the controller 60 collects the contamination information again from the contamination degree determination unit 30 to determine whether the degree of contamination of the environmental sensor S or the protector 20 exceeds the reference value in step S16. Upon determining that the degree of contamination thereof exceeds the reference value even after sensor cleaning is performed (N in S16), the controller 60 moves the protector 20 in step S18. Specifically, the controller 60 drives the driving source 120 to allow the protector 20 to move by a preset movement distance. As shown in FIG. 8, according to the present disclosure, when a portion of the protector 20 facing the environmental sensor S is contaminated, the protector 20 may be moved in the movement direction thereof.

After the protector 20 moves, the controller 60 determines again whether the contamination is removed through the contamination degree determination unit 30 in step S20. When the contamination is not removed despite the movement of the protector 20 (N in S20), the controller 60 may move the protector 20 again.

There can be a situation where contamination of the protector 20 cannot be resolved even if the protector 20 changes its position, such as when all portions of the protector 20 are contaminated. To address this issue, the controller 60 determines whether it is unnecessary to further change the position of the protector 20. In other words, the controller 60 determines whether it is impossible to perform the movement of the protector 20 in step S22. For example, the controller 60 may determine whether it is impossible to perform the movement of the protector 20 based on information indicating whether the protector 20 has moved a preset number of times so far. In another embodiment, the controller 60 may determine whether it is impossible to perform the movement of the protector 20 based on information indicating whether the protector 20 has moved by a preset movement distance so far.

Upon determining that there is a clean portion remaining in the protector 20 (N in S22), the process returns to step S18. Conversely, upon determining that there is no clean portion remaining in the protector 20 (Y in S22), the controller 60 outputs a maintenance alarm message to the cluster 50 in step S24, and the operation of the sensor protection device is terminated in step S26.

Figure 9:
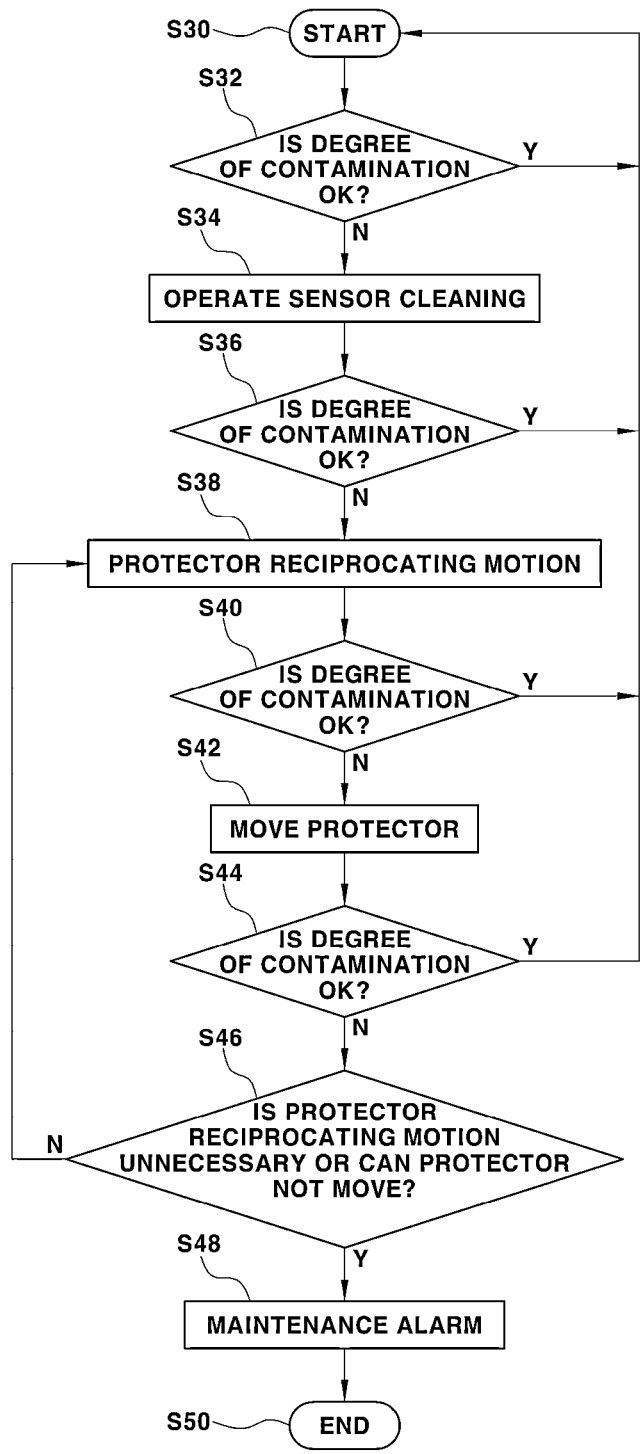
FIG. 9 shows an operation flowchart of the sensor protection device according to some embodiments of the present disclosure.

FIG. 9 shows an operation flowchart of the sensor protection device including the blade 40 according to some embodiments of the present disclosure.

In step S30, the operation of the sensor protection device is started.

The controller 60 collects the contamination information of the environmental sensor S or the protector 20 from the contamination degree determination unit 30. The controller 60 determines whether the degree of contamination exceeds the preset reference value based on the contamination information from the contamination degree determination unit 30 in step S32.

When the degree of contamination exceeds the preset reference value (N in S32), the controller 60 causes the sensor cleaning system 10 to perform sensor cleaning in step S34. As described above, the controller 60 may directly issue the cleaning command to the sensor cleaning system 10 or may indirectly make the cleaning request to the sensor cleaning system 10.

Figure 10:
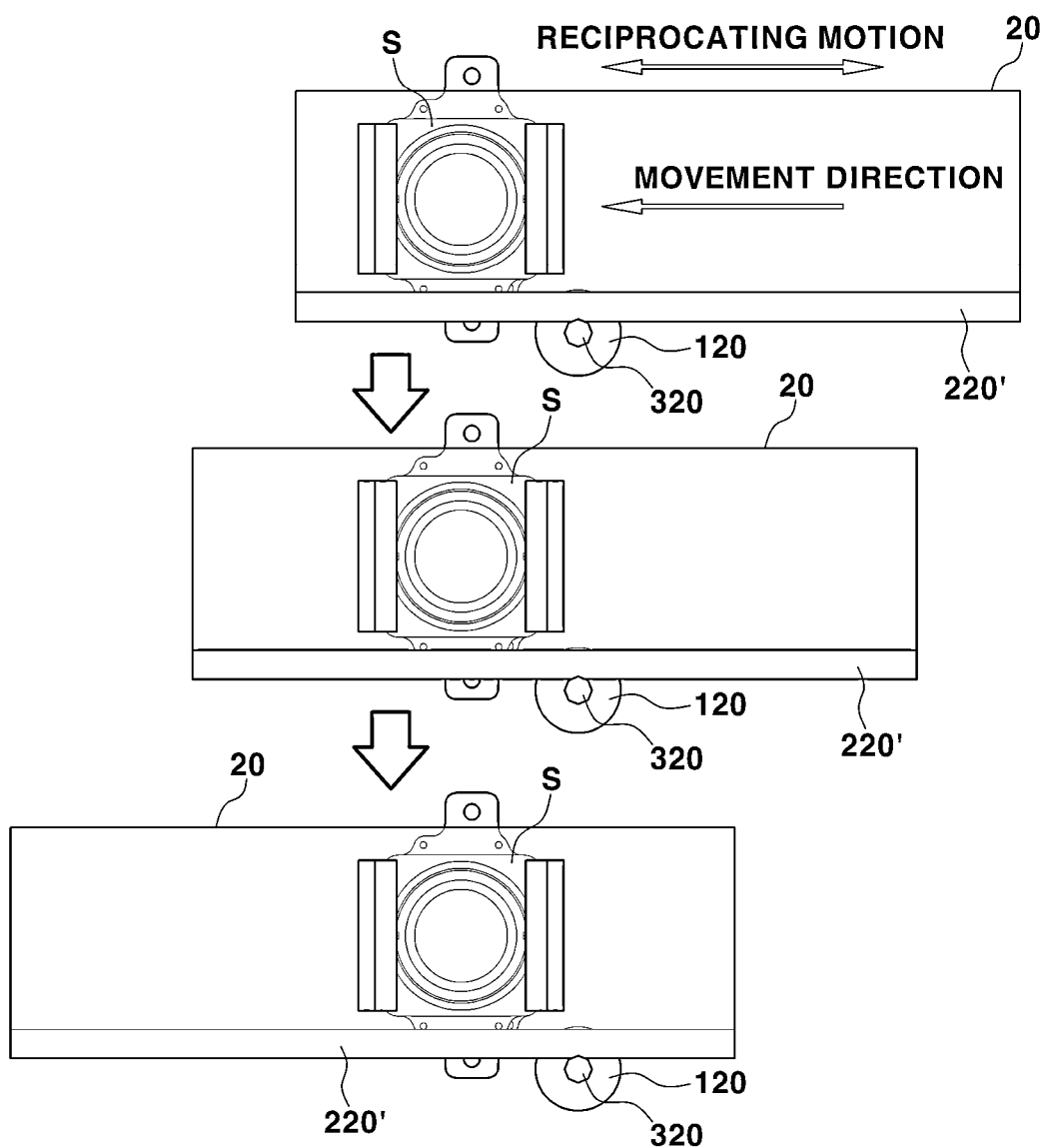
FIG. 10 shows a movement of the protector of the sensor protection device according to some embodiments of the present disclosure.

After sensor cleaning is performed, the controller 60 collects the contamination information from the contamination degree determination unit 30 to determine whether the degree of contamination of the environmental sensor S exceeds the reference value in step S36. Upon determining that the degree of contamination thereof exceeds the reference value even after sensor cleaning is performed (N in S36), the controller 60 causes the protector 20 to reciprocate in step S38. Specifically, the controller 60 drives the driving source 120 to cause the protector 20 to reciprocate by a preset movement distance. The protector 20 reciprocates a preset number of times by the preset movement distance so that the blade 40 scrapes off the contaminants on the protector 20. As shown in FIG. 10, the protector 20 may move in the movement direction thereof and may reciprocate.

After the reciprocating motion of the protector 20, the controller 60 determines again whether the contaminants thereon are removed by the operation of the blade 40 through the contamination degree determination unit 30 in step S40. When the contaminants thereon are not removed despite the operation of the blade 40 (N in S40), the controller 60 may move the protector 20 in step S42. Next, the controller 60 determines again whether the degree of contamination in a newly positioned portion of the protector 20 is within an acceptable range in step S44.

There can be a situation where contamination of the protector 20 cannot be resolved even if the protector 20 linearly moves or reciprocates, such as when all portions of the protector 20 are contaminated (N in S44). To address this issue, the controller 60 determines whether it is unnecessary to further change the position of the protector 20. In other words, the controller 60 determines whether it is impossible to perform the movement of the protector 20 in step S46. For example, the controller 60 may determine whether it is impossible to perform the movement of the protector 20 based on the number of times of reciprocating motion of the protector 20 and the movement distance thereof. In another embodiment, the controller 60 may determine whether it is impossible to perform the movement of the protector 20 based on information indicating whether the protector 20 has moved by a preset movement distance so far.

Upon determining that there is a clean portion remaining in the protector 20 (N in S46), the process returns to step S38. Conversely, upon determining that there is no clean portion remaining in the protector 20 (Y in S46), the controller 60 outputs the maintenance alarm message to the cluster 50 in step S48 and the operation of the sensor protection device is terminated in step S50.

According to the present disclosure, when permanent damage occurs on the surface of the environmental sensor due to scratches or the like, it is possible to improve the difficulty in recognizing objects by the environmental sensor. The position of the protector 20 is configured to be changeable. Thus, it is possible to prevent the environmental sensor from having the difficulty in recognizing objects when the coating of the environmental sensor is peeled off or cracks occur on the surface of the environmental sensor due to an impact applied thereto.

According to the present disclosure, it is possible to prevent excessive operation of the sensor cleaning system. The sensor cleaning system may excessively operate to remove stains that do not easily come off of the environmental sensor. According to the present disclosure, this type of excessive operation may be avoided. Accordingly, loads applied to the sensor cleaning system may be reduced and maintenance interval of the washer fluid may be prolonged. Here, in the sensor cleaning system using compressed air, when cleaning is frequently performed, a significant load may be applied to a compressor. Further, in the sensor cleaning system using a washer fluid, the replenishment cycle of the washer fluid is shortened due to frequent cleaning performance.

According to the present disclosure, stuck stains may be removed. Particularly, when the sensor protection device includes a blade, it is possible to scrape off hardened foreign substances using the blade.

According to the present disclosure, a maintenance cycle may be increased and costs may be reduced. When only the surface of the protector disposed in front of the sensing portion of the environmental sensor is damaged, it is possible to solve this problem by changing the position of the protector. In addition, only the protector needs to be replaced, thereby reducing costs.

As is apparent from the above description, the present disclosure provides a sensor protection device capable of protecting a sensor of a vehicle and a sensor cleaning system thereof and ultimately improving durability thereof.

The effect of the present disclosure is not limited to the above-mentioned effect. Other effects not mentioned should be clearly understood by those skilled in the art in detailed descriptions of the embodiments.

The present disclosure has been described in detail with reference to embodiments thereof. However, it should be appreciated by those skilled in the art that changes may be made in these embodiments without departing from the principles and spirit of the present disclosure, the scope of which is defined in the appended claims and equivalents thereto.

What is claimed is:

1. A control system of a sensor protection device, the control system comprising:
    an environmental sensor configured to detect a surrounding environment of a vehicle;
    a protector disposed to allow a sensing signal of the environmental sensor to pass through the protector;
    a movement mechanism configured to provide power to the protector;
    a contamination degree determination unit configured to determine a degree of contamination of the environmental sensor;
    a blade adjacent to the protector and fixed to a vehicle body of the vehicle to contact the protector; and
    a controller configured to collect contamination degree information from the contamination degree determination unit and to control operation of a sensor cleaning system of the vehicle and the movement mechanism,
    wherein the sensor cleaning system is configured to clean the environmental sensor or the protector, and
    wherein the controller is further configured to:
        operate the movement mechanism so that the protector reciprocates a preset number of times with respect to the environmental sensor at a first location based on determining that the environmental sensor is contaminated based on the contamination degree information;
        move the protector by a preset distance to a second location after the protector reciprocates;
        operate the movement mechanism so that the protector reciprocates the preset number of times with respect to the environment sensor at the second location based on determining that the environmental sensor is contaminated based on the contamination degree information;
        move the protector by the preset distance to a third location after the protector reciprocates; and
        provide a maintenance alarm to a cluster of the vehicle based on determining that the protector has moved a preset movement distance from the first location.

2. The control system of claim 1, wherein the controller is configured to collect first contamination degree information of the environmental sensor from the contamination degree determination unit at the first location, and is configured to operate the sensor cleaning system based on determining that the environmental sensor is contaminated based on the first contamination degree information.

3. The control system of claim 2, wherein the controller is configured to collect second contamination degree information of the environmental sensor from the contamination degree determination unit at the first location after operating the sensor cleaning system, and is configured to operate the movement mechanism so that the protector moves by the preset distance to the second location based on determining that the environmental sensor is contaminated based on the second contamination degree information.

4. The control system of claim 3, wherein the controller is configured to collect third contamination degree information of the environmental sensor from the contamination degree determination unit after the protector moves by the preset distance to the second location, and is configured to move the protector again by the preset distance based on determining that the environmental sensor is contaminated based on the third contamination degree information.

5. The control system of claim 4, wherein the controller is configured to provide a maintenance alarm to a cluster of the vehicle based on determining that the degree of contamination of the environmental sensor is maintained despite movement of the protector.

6. The control system of claim 2, wherein the controller is configured to collect second contamination degree information of the environmental sensor from the contamination degree determination unit at the first location after operating the sensor cleaning system, and is configured to operate the movement mechanism so that the protector reciprocates the preset number of times with respect to the environmental sensor based on determining that the environmental sensor is contaminated based on the second contamination degree information.

7. The control system of claim 6, wherein the controller is configured to collect third contamination degree information of the environmental sensor from the contamination degree determination unit after the protector reciprocates at the first location, and is configured to move the protector by the preset distance to the second location based on determining that the environmental sensor is contaminated based on the third contamination degree information.

8. The control system of claim 7, wherein the controller is configured to provide a maintenance alarm to a cluster of the vehicle based on determining that the environmental sensor is contaminated despite movement of the protector.

* * * * *